US010059586B2

(12) United States Patent
Abdulrahman

(10) Patent No.: US 10,059,586 B2
(45) Date of Patent: Aug. 28, 2018

(54) DIRECT CONTACT HEAT TRANSFER IN THE THERMOLYSIS REACTOR OF HYDROGEN PRODUCTION CU—CL CYCLE

(71) Applicant: Mohammed Wassef Abdulrahman, Oshawa (CA)

(72) Inventor: Mohammed Wassef Abdulrahman, Oshawa (CA)

(73) Assignee: Mohammed Wassef Abdulrahman, Oshawa (CA)

( * ) Notice: Subject to any disclaimer, the term of this patent is extended or adjusted under 35 U.S.C. 154(b) by 0 days.

(21) Appl. No.: 15/210,806

(22) Filed: Jul. 14, 2016

(65) Prior Publication Data

US 2017/0015552 A1 Jan. 19, 2017

Related U.S. Application Data

(60) Provisional application No. 62/192,518, filed on Jul. 14, 2015.

(51) Int. Cl.
*C01B 3/06* (2006.01)
*B01J 19/00* (2006.01)
(Continued)

(52) U.S. Cl.
CPC .............. *C01B 3/068* (2013.01); *B01J 7/00* (2013.01); *B01J 19/006* (2013.01);
(Continued)

(58) Field of Classification Search
CPC ............ B01J 2208/00752; B01J 8/0453; B01J 2219/00006; B01J 8/002; B01J 8/003;
(Continued)

(56) References Cited

U.S. PATENT DOCUMENTS

| 8,628,725 | B2 * | 1/2014 | Gabriel | ...................... B01J 7/00 |
| | | | | 205/574 |
| 2014/0348742 | A1 * | 11/2014 | Dadasaheb | ............... C01B 3/08 |
| | | | | 423/657 |
| 2017/0015551 | A1 | 1/2017 | Abdulrahman | |

FOREIGN PATENT DOCUMENTS

EP  0761298 A2 *  3/1997  .............. B01F 5/046

OTHER PUBLICATIONS

Abdulrahman, M. W. (2016). Similitude for thermal scale-up of a multiphase thermolysis reactor in the Cu—Cl cycle of a hydrogen production. World Academy of Science, Engineering and Technology, International Journal of Electrical, Computer, Energetic, Electronic and Communication Engineering, 10 (5), 567-573.

(Continued)

*Primary Examiner* — Amber Rose Orlando
*Assistant Examiner* — Syed Taha Iqbal
(74) *Attorney, Agent, or Firm* — Bereskin & Parr LLP/S.E.N.C.R.L., s.r.l.; Tony Orsi

(57) ABSTRACT

In the thermochemical water splitting process by Cu—Cl cycle, oxygen gas is produced by a thermolysis process in a three-phase reactor. IN accordance with the teachings herein, a technique is provided to achieve the high challenging thermal requirements of the thermolysis reactor, whereby an optimized heat transfer configuration is used. The technique involves using some of the pre-heated stoichiometric oxygen gas produced from the thermolysis reaction, to transfer heat directly to the slurry of molten CuCl and solid $Cu_2OCl_2$ inside the thermolysis reactor. Experiments were performed to examine the volumetric heat transfer coefficient for the direct contact heat transfer between the gas and the slurry. It was found that the thermal scale up analysis of the thermolysis reactor with direct contact heat transfer, is based on the amount of heat carried (Continued)

by the oxygen gas rather than the amount of heat transferred by direct contact heat transfer.

12 Claims, 10 Drawing Sheets

(51) Int. Cl.
*C01G 3/05* (2006.01)
*B01J 7/00* (2006.01)

(52) U.S. Cl.
CPC ....... *B01J 19/0013* (2013.01); *B01J 19/0046* (2013.01); *C01G 3/05* (2013.01); *B01J 2219/00015* (2013.01); *B01J 2219/0059* (2013.01); *B01J 2219/00123* (2013.01); *B01J 2219/00594* (2013.01); *B01J 2219/00596* (2013.01); *B01J 2219/00745* (2013.01); *B01J 2219/00763* (2013.01); *B01J 2219/00768* (2013.01)

(58) Field of Classification Search
CPC .......... B01J 8/0496; B01J 10/005; B01J 7/00; Y02E 60/36; C01B 13/0207; C01B 3/068; C25C 1/12
See application file for complete search history.

(56) References Cited

OTHER PUBLICATIONS

Abdulrahman, M. W. (2016). Heat transfer analysis of a multiphase oxygen reactor heated by a helical tube in the Cu—Cl cycle of a hydrogen production. World Academy of Science, Engineering and Technology, International Journal of Mechanical, Aerospace, Industrial, Mechatronic and Manufacturing Engineering, 10 (6), 1018-1023.
Borgnakke, C., & Sonntag, R. E. (2009). Fundamentals of Thermodynamics (7th ed.). Appendix A SI Units: Single-State Properties, p. 761, USA: John Wiley & Sons, Inc.
Janz, G. J. (1988). Thermodynamic and transport properties for molten salts: Correlation equations for critically evaluated density, surface tension, electrical conductance, and viscosity data. Journal of Physical and Chemical Reference Data, 17, Supplement No. 2, p. 125.
Lemmon, E. W., & Jacobsen, R. T. (2004). Viscosity and thermal conductivity equations for nitrogen, oxygen, argon, and air, International Journal of Thermophysics, 25, (1), 21-69.
Lewis, M. A, Serban, M. & Basco, J.K. (2003). Hydrogen production at <550° C. using a low temperature thermochemical cycle. Second Information Exchange Meeting, Argonne, Illinois, USA, pp. 145-156.
Marin, G. D. (2012). Kinetics and transport phenomena in the chemical decomposition of copper oxychloride in the thermochemical Cu—Cl cycle (Doctoral dissertation). University of Ontario Institute of Technology, Ontario, Canada.
McCutcheon, S. C., Martin, J. L., & Barnwell, T. O. (1993). Water quality. In D. R. Maidment (Editor), Handbook of Hydrology (p. 11.3) New York: McGraw-Hill.
Morrison, T. J., & Johnstone, N. B. (1954). Solubilities of the inert gases in water. Journal of Chemical Society, 3441-3446.
Naterer, G. F., Gabriel, K., Wang, Z. L., Daggupati, V. N., & Gravelsins, R. (2008). Thermochemical hydrogen production with a copper-chlorine cycle. I: Oxygen release from copper oxychloride decomposition. International Journal of Hydrogen Energy, 33, 5439-5450.
Osborne, N. S., Stimson, H.F. & Ginnings, D.C. (1939). Measurements of heat capacity and heat of vaporization of water in the range 0° to 100° C. Part of Journal of Research of the National Bureau of Standards, vol. 23, p. 238.
Petersen, H. (Sep. 1970). The properties of helium: Density, specific heats, viscosity, and thermal conductivity at pressures from 1 to 100 bar and from room temperature to about 1800 K. Risö Report No. 224. Danish atomic energy commission research establishment Risö, pp. 1-42.
Ramires, M. L. V., Nieto de Castro, A., Nagasaka, Y., Nagashima, A., Assael, M. J., Wakeham, W. A. (1994). Standard reference data for the thermal conductivity of water. American Institute of Physics and the American Chemical society, pp. 1377-1381.
Viswanath, D.S., Ghosh, T., Prasad, D.H., Dutt N.K. & Rani, K.Y. (2007). Viscosity of liquids: theory, estimation, experiment, and data. Dordecht, NL: Springer, p. 199.
Robert, F. B., (2003). Direct contact heat transfer. In A. Bejan, & A. D. Kraus (Eds.), Heat transfer handbook (p. 1374). John Wiley & Sons, Inc.
Serban, M., Lewis, M. A., & Basco, J. K. (Apr. 2004). Kinetic study of the hydrogen and oxygen production reactions in the copper-chloride thermochemical cycle. American Institute of Chemical Engineers Journal, Spring National Meeting, New Orleans, LA, pp. 2-10.
Sonin, A. A. (2001). The physical basis of dimensional analysis (2nd ed.), Department of Mechanical Engineering, Cambridge, pp. 1-57.
Vargaftik, N. B., Volkov, B. N., & Voljak, L D. (1983). International tables of the surface tension of water. Moscow Aviation Institute, Moscow, U.S.S.R. Journal of Physical and Chemical Reference Data, 12 (3), 817-820.
Zamfirescu, C., Dincer, I., & Naterer, G. F. (2010). Thermophysical properties of copper compounds in copper-chlorine thermochemical water splitting cycles. International Journal of Hydrogen Energy, 35, 4839-4852.
Abdulrahman, M. W. (2015). Experimental studies of direct contact heat transfer in a slurry bubble column at high gas temperature of a helium-water-alumina system. Applied Thermal Engineering, 91, 515-524.
Abdulrahman, M. W. (2016). Experimental studies of the transition velocity in a slurry bubble column at high gas temperature of a helium-water-alumina system. Experimental Thermal and Fluid Science, 74, 404-410.
Abdulrahman, M. W. (2016). Experimental studies of gas holdup in a slurry bubble column at high gas temperature of a hielium-water-alumina system. Chemical Engineering Research and Design, 109, 486-494.
Abdulrahman, M. W., Wang, Z., & Naterer, G. F. (2013). Scale-up analysis of three-phase oxygen reactor in the Cu—Cl thermochemical cycle of hydrogen production. EIC Climate Change Technology Conference 2013 (CCTC2013) Paper No. 1569694427. Montreal, Canada, pp. 1-11.
Bevington, P. R., & Keith, R. (2003). Data Reduction and Error Analysis for the Physical Sciences (3rd ed.). McGraw-Hill, New York, pp. 1-320.
Kline, S.J., & McClintock, F. A. (1953). Describing uncertainties in single-sample experiments. Journal of Mechanical Engineering, 75, 3-8.

\* cited by examiner

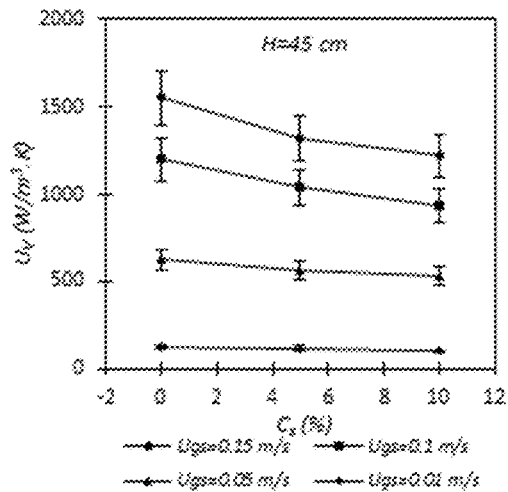
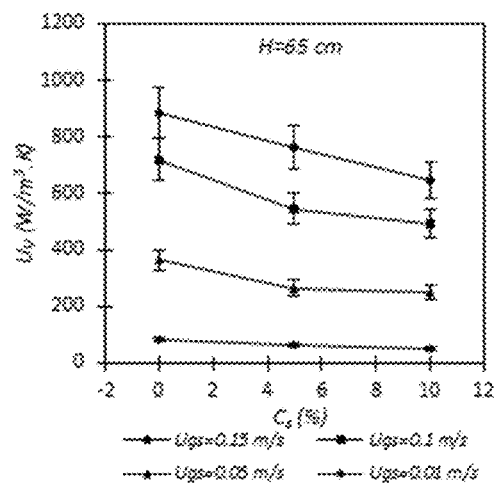
Fig. 8a  Fig. 8b
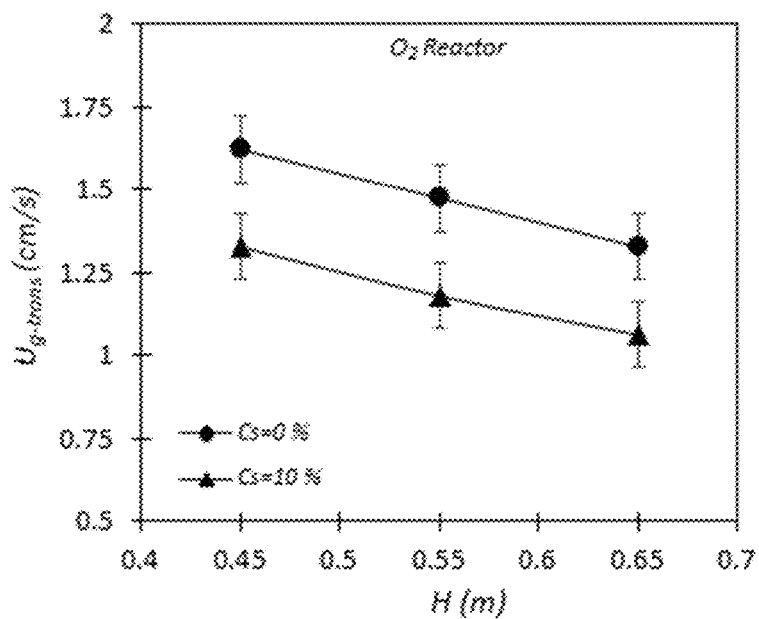
Fig. 9

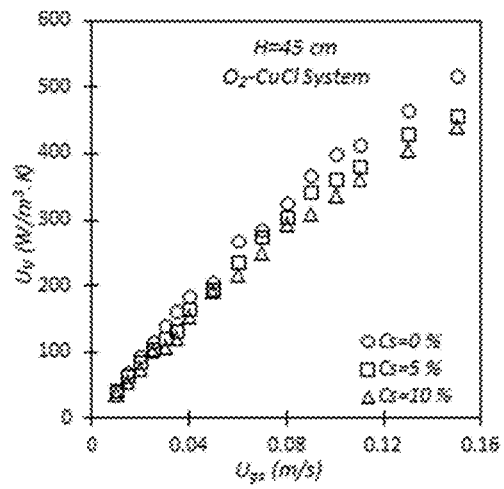
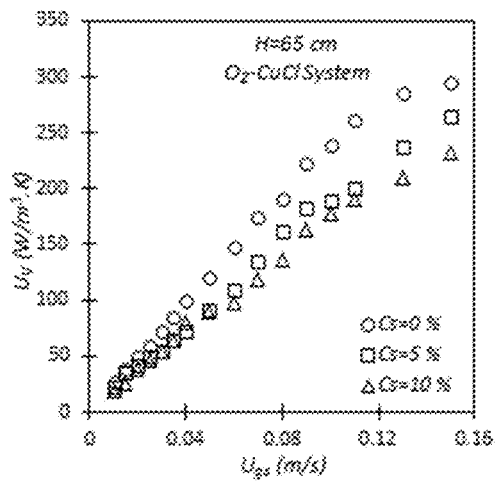
Fig. 12a Fig. 12b
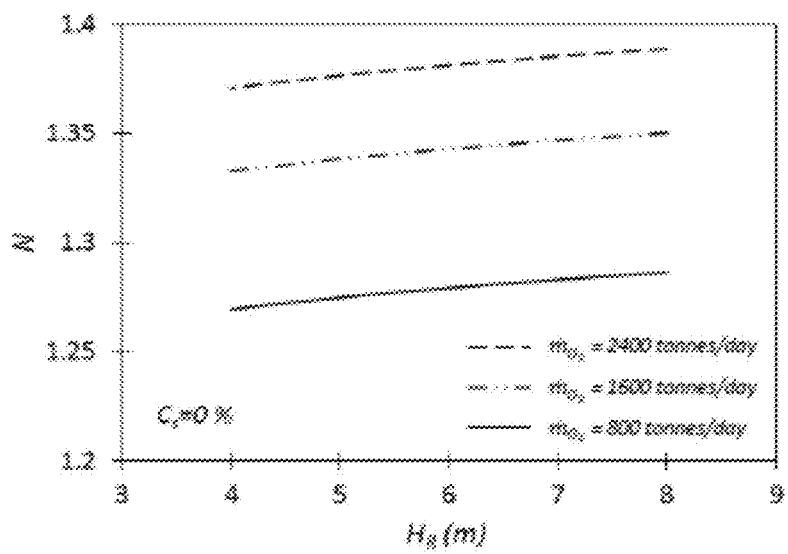
Fig. 13

DIRECT CONTACT HEAT TRANSFER IN THE THERMOLYSIS REACTOR OF HYDROGEN PRODUCTION CU—CL CYCLE

CROSS-REFERENCE

This application claims the benefit of U.S. Provisional Patent Application No. 62/192,518 filed Jul. 14, 2015; the entire contents of patent application Ser. No. 62/192,518 are hereby incorporated by reference.

FIELD

Various embodiments are described herein for using some of the pre-heated stoichiometric oxygen gas produced in the oxygen production step of the thermolysis reaction in the Cu—Cl cycle, to transfer heat directly from oxygen gas to the slurry of molten CuCl and solid $Cu_2OCl_2$.

BACKGROUND

Copper-chlorine (Cu—Cl) cycle was identified as one of the promising lower temperature cycles to convert water into hydrogen and oxygen (Lewis et al., 2003; Serban et al., 2004). In particular, the CuCl cycle includes three chemical reactions to decompose water into hydrogen and oxygen. Two of the chemical reactions are thermal and one is an electrochemical reaction (Marin, 2012). The primary advantage of the Cu—Cl cycle is the low operating temperature (530° C.) compared to other thermochemical cycles. At this operating temperature, the CuCl cycle can be linked to Canada's Generation IV nuclear reactor, which is the CANDU Super-Critical Water Reactor (CANDU-SCWR).

The three reaction steps of the Cu—Cl cycle (see FIG. 1) are (Marin, 2012):

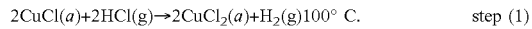

$$2CuCl(a)+2HCl(g) \rightarrow 2CuCl_2(a)+H_2(g) \quad 100° C. \qquad \text{step (1)}$$

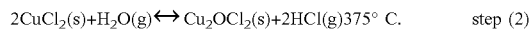

$$2CuCl_2(s)+H_2O(g) \leftrightarrow Cu_2OCl_2(s)+2HCl(g) \quad 375° C. \qquad \text{step (2)}$$

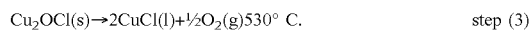

$$Cu_2OCl_2(s) \rightarrow 2CuCl(l)+½O_2(g) \quad 530° C. \qquad \text{step (3)}$$

where a, s, l and g denote aqueous, solid, liquid and gas respectively.

In the oxygen production step of the Cu—Cl cycle (Step 3), a solid copper oxychloride ($Cu_2OCl_2$), is decomposed thermally into oxygen gas ($O_2$) and molten cuprous chloride (CuCl). The solid $Cu_2OCl_2$ is fed into an oxygen production thermolysis reactor from the $CuCl_2$ hydrolysis reaction (Step 2) that operates at an average temperature of 375° C. The materials leaving the thermolysis reactor are oxygen gas and molten CuCl (which are evolved at a temperature of about 530° C.). In the thermolysis reactor, the decomposition of $Cu_2OCl_2$ to oxygen and molten CuCl is an endothermic reaction requiring a reaction heat of 129.2 kJ/mol and a temperature of 530° C., which is the highest temperature in the Cu—Cl cycle. Thus, heat must be added to increase the temperature of the slurry inside the thermolysis reactor. The total amount of heat required is the sum of reaction heat and the heat required to raise the reactant temperature from 375° C. (average temperature of solid particles from the hydrolysis reaction) to 530° C. (Naterer et al., 2008). However, there are some challenges that accompany the thermal design of the thermolysis reactor such as, but not limited to: the high temperature of the decomposition process (530° C.) and the large amount of heat that is required for the decomposition process in the thermolysis reactor.

SUMMARY OF VARIOUS EMBODIMENTS

In a broad aspect, at least one embodiment described herein provides a thermolysis reactor for the thermochemical Cu—Cl cycle of hydrogen production, wherein the thermolysis reactor comprises a housing; an inlet on a first portion of the housing for receiving copper oxychloride solid particles; a reaction chamber within the housing for facilitating the thermochemical Cu—Cl cycle where the copper oxychloride solid particles thermally decompose into oxygen gas and molten cuprous chloride; at least one gas outlet on a second portion of the housing for expelling the oxygen the expelled oxygen gas and an injection element coupled to an inlet on a bottom portion of the housing for injecting the heated oxygen gas into the reaction chamber to provide further heating for the thermochemical Cu—Cl cycle.

In at least some embodiments, the heating element comprises a heat exchanger and the injection element comprises a gas sparger.

In at least some embodiments, the expelled oxygen gas is stoichiometric high temperature oxygen gas that is produced from the decomposition process inside the thermolysis reactor at a temperature of 500-540° C., and more preferably 530° C.

In at least some embodiments, the heating element is configured to heat the portion of expelled oxygen gas to a higher temperature of 600-615° C., and more preferably 600° C. For example, the heating element may comprise a nuclear reactor of the type CANDU-SCWR.

In at least some embodiments, the reactor further comprises at least one overflow outlet on an upper portion of the housing for expelling overflowed liquid; and baffles disposed within the reaction chamber to prevent the copper oxychloride solid particles and the oxygen gas from exiting through the at least one overflow outlet.

In at least some embodiments, the re-injected heated oxygen gas is heated to provide heat needed for the decomposition of the copper oxychloride solid particles.

In another broad aspect, at least one embodiment described herein provides a method for facilitating the thermochemical Cu—Cl cycle of hydrogen production in a thermolysis reactor having a housing and a reaction chamber. The method comprises receiving copper oxychloride solid particles into a reaction chamber; decomposing the copper oxychloride solid particles thermally into oxygen gas and molten cuprous chloride; expelling oxygen gas; heating a portion of the expelled oxygen gas; and injecting the heated portion the reaction chamber to provide further heating for the thermochemical Cu—Cl cycle.

In at least some embodiments, the re-injected heated oxygen gas is heated to provide heat needed for the decomposition of the copper oxychloride solid particles.

In at least some embodiments, the method comprises fixing materials of the inventories and operating conditions, and performing experimental thermal scale up analysis of the thermolysis reactor based on determining the effects of parameters including at least one of a static liquid height (H), a superficial gas velocity ($U_{gs}$), and a solid particles concentration ($C_s$).

In at least some embodiments, the effects of the parameters are formulated using empirical equations of the volumetric Nusselt number ($Nu_V$).

In at least some embodiments, the empirical equation for a homogeneous (bubbly) flow regime is:

$$Nu_V = 0.0165 \left(\frac{D_R}{H_R}\right)^{1.71} Re_l(1-C_S)^{3.32}, R^2 = 0.99.$$

In at least some embodiments, the empirical equation for a churn turbulent flow regime is:

$$Nu_V = 0.0315 \left(\frac{D_R}{H_R}\right)^{1.765} (Re_l)^{0.93}(1-C_S)^{2.94}, R^2 = 0.99.$$

In at least some embodiments, the equations are used for:

$$\frac{H_R}{D_R} \leq 4, C_S \leq 15\%$$

and $U_{gs} \leq 0.15$ m/s.

In at least some embodiments, for industrial reactors with large dimensions and large solid concentrations where the minimum stoichiometric superficial oxygen gas velocity will be at least an order of magnitude higher than the transition velocity of the thermolysis reactor, the bubbly flow regime will not occur.

In at least some embodiments, the method comprises adjusting the rate of injecting the heated oxygen gas to control the amount of heat that can be transferred by using direct contact between the molten CuCl and the stoichiometric $O_2$ gas bubbles.

In such cases, the number of thermolysis reactors depends on superficial gas velocity of the oxygen gas ($U_{gs}$) and oxygen production rate ($\dot{m}_{O_2}$) according to:

$$N = \frac{0.3012 \, \dot{m}_{O_2}}{U_{gs}}$$

where $\dot{m}_{O_2}$ is the oxygen production rate in tonnes/day and $U_{gs}$ is the oxygen superficial gas velocity in m/s.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 8a and 8b show plots of the volumetric heat transfer coefficient versus $C_s$ of helium-water-alumina slurry bubble column for different $U_{gs}$ at H=45 cm (FIG. 8a) or H=65 cm (FIG. 8b) as determined by experimentation.

FIG. 9 shows the transition velocity versus H of the actual materials of the thermolysis reactor for different $C_s$ values as determined by experimentation.

FIGS. 12a and 12b show the volumetric heat transfer coefficient of an $O_2$—CuCl system for different $C_s$ values for H=45 cm (see FIG. 12a) and H=65 cm (see FIG. 12b) as determined experimentally.

FIG. 13 shows the number of $O_2$ bubble column reactors versus reactor height ($H_R$) for different $\dot{m}_{O_2}$ and $C_s$=0%.

Figure 1:
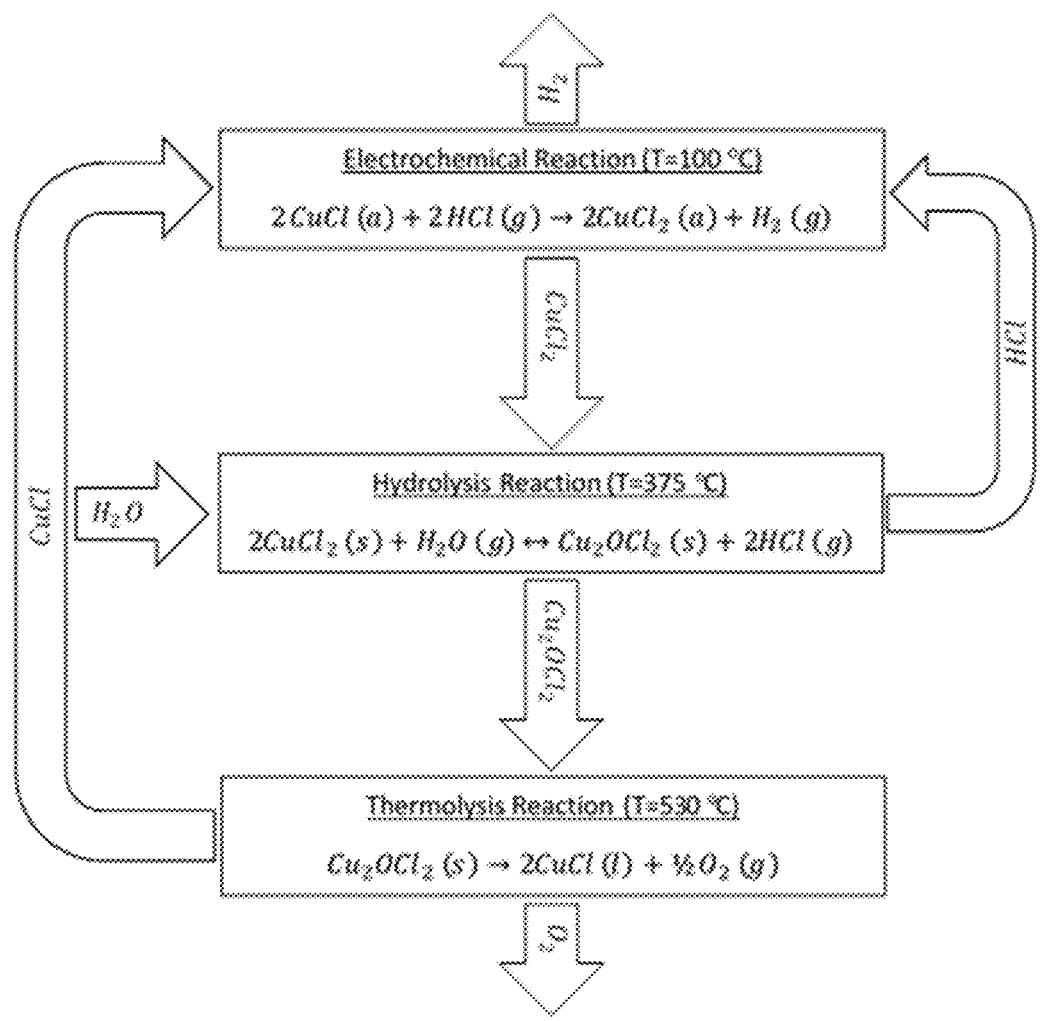
FIG. 1 is a flow chart for the three reaction steps of the Cu—Cl cycle.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the systems or methods described below or to features common to multiple or all of the systems and or methods described herein. It is possible that there may be a system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 5% or 10%, for example, as the case may be.

There are some challenges that accompany the thermal design of a thermolysis reactor that is used for the Cu—Cl cycle such as, but not limited to, the high temperature of the decomposition process (530° C.) when using certain materials, and the large amount of heat that is required for the decomposition process in the thermolysis reactor.

In at least one embodiment described herein, in accordance with the teaching herein, there is provided a heat transfer configuration that may be used with a thermolysis reactor design that is simple to implement, has a low cost and can achieve the thermal requirements of the thermolysis reactor. A scale up analysis of the thermolysis reactor from the perspective of heat transfer is also provided herein. For example, in the hydrogen production Cu—Cl cycle, the design and scale-up of the thermolysis reactor uses knowledge of the kinetics, hydrodynamics, and heat as well as mass transfer characteristics, among other. Therefore, in the example of the CuCl cycle, to scale up the thermolysis reactor thermally, the direct contact heat transfer between the oxygen gas and the slurry of molten CuCl and solid $Cu_2OCl_2$ is studied herein. The effects of design parameters such as the dimensions of the reactor, and input parameters such as superficial gas velocity and solid concentration on the thermal scale up analysis of the thermolysis reactor are also discussed herein.

The teachings herein are discussed through an example embodiment involving hydrogen production by the thermochemical copper-chlorine (Cu—Cl) cycle. However, the teachings herein may be applied to any other reactors that facilitate similar chemical reactions where one gas is produced at a high temperature from the chemical reaction and this gas is prevented from reacting chemically with the other inventories (e.g. input or by-product materials) and the reaction is endothermic. More particularly, the example relates to the oxygen production step in the Cu—Cl cycle and a novel technique for using some of the pre-heated stoichiometric oxygen gas produced from the thermolysis reaction in the Cu—Cl cycle, to transfer heat directly to the slurry of molten CuCl and solid $Cu_2OCl_2$ inside the thermolysis reactor. The stoichiometric oxygen gas produced at a temperature of 500-540° C., and more preferably at 530° C., can be heated to a higher temperature of 600-615° C., and more preferably 600° C. by using a heat source, such as by using a nuclear reactor heat source of the type CANDU-SCWR. Then, in accordance with the teachings herein, the heated oxygen gas can be re-injected into the thermolysis (i.e. oxygen) reactor from the bottom of the reactor through a sparger to directly provide the necessary heat for the endothermic chemical reaction (Le, decomposition process) by direct contact heat transfer between the heated oxygen gas and the slurry inside the thermolysis reactor. There are many types of spargers that may be used in practice and the sparger type does not have an effect on scale-up analysis. This technique of heat transfer takes advantage of the high temperature oxygen gas that is produced from the decomposition process inside the thermolysis reactor in reusing the high temperature oxygen gas to further aid in the decomposition of the solid $Cu_2OCl_2$ inside the thermolysis reactor thereby overcoming the challenges of the high temperature and the large amount of heat required for the decomposition process.

Figure 2:
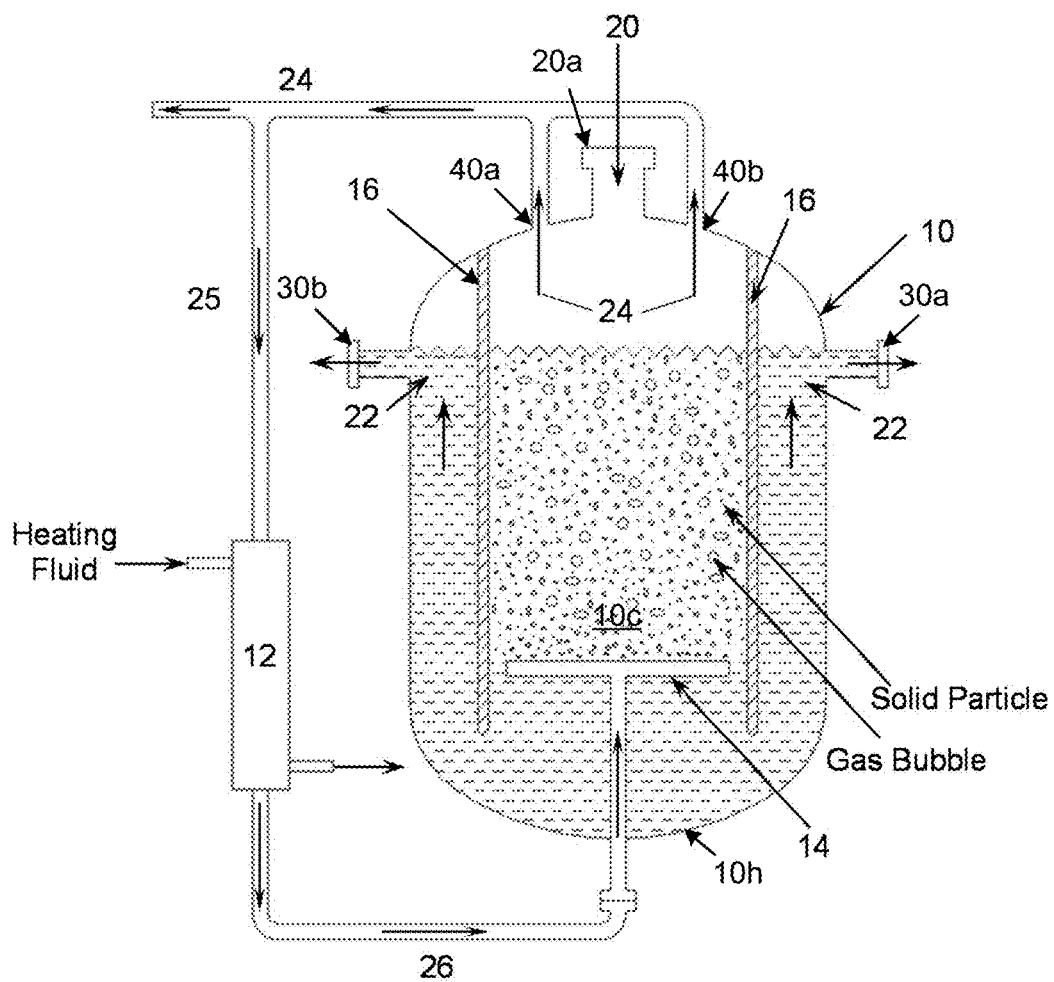
FIG. 2 is an illustration of an example embodiment of a multiphase thermolysis reactor and the process of direct contact heat transfer method inside it.

Referring now to FIG. 2, shown therein is a thermolysis reactor vessel 10 which is fed solid copper oxychloride solid particles 20 via an inlet 20a at an upper portion of the vessel housing 10h. The solid copper oxychloride solid particles 20 decompose thermally at a temperature of 530° C. into liquid molten CuCl salt 22 and oxygen gas 24 in a reaction chamber 10c of the vessel 10.

The gas is removed from the thermolysis reactor vessel 10 via gas outlets 40a and 40b. In other embodiments, there may be one gas outlet or more than two gas outlets. The reactor vessel 10 includes a return pathway having a heating element 12 for heating a portion of the expelled oxygen gas 25 to create heated oxygen gas 26. The return pathway also comprises an injection element 14 coupled to an inlet on a bottom portion of the housing 10h of the reactor vessel 10 that is used for injecting the heated oxygen gas 26 into the reaction chamber 10c. For instance, some of the gas 25 that exists the vessel 10 is at a temperature of 530° C. and is heated by a heat exchanger (that acts as the heating element 12) to produce oxygen gas 26 at a temperature of 600° C., The heat exchanger can be implemented using a CANDU-SCWR (i.e. a Canada Deuterium-Uranium-Super Critical Water Reactor). In alternative embodiments, the heating element can be any suitable high temperature heat source such as a High Temperature Gas Reactor (HTGR) and a solar heat source, for example. The HTGR may be preferred because of its high temperature which is (900-1000° C.) compared with that of the SCWR which is about 600-625° C.

The heated oxygen gas 26 that is re-injected into the thermolysis reactor vessel 10 may be passed through a gas sparger (that acts as the injection element 14). The re-injected heated oxygen gas 26 provides the necessary heat for the endothermic chemical reaction inside the reaction chamber 10c of the reactor vessel 10. The molten salt CuCl 22 is overflowed outside the thermolysis reactor vessel 10 via overflow outlets 30a and 30b (in alternative embodiments, there may be one, or more than two overflow outlets depending on the flow rate and volume of the material that is overflowed). The baffles 16 inside the thermolysis reactor vessel 10 are used to prevent solid particles and oxygen gas from passing with the molten salt 20 outside the thermolysis reactor vessel 10. In cylindrical reactor vessels, the baffles can be a cylindrical shell.

To scale up the thermolysis reactor 10 on the basis of heat transfer, experimental studies must be performed with the actual materials used in the thermolysis reactor such as molten salt CuCl and oxygen gas. There are some challenges in using the actual products of the thermolysis reactor ($O_2$ and CuCl) at the operating conditions of the thermolysis reactor. These challenges include: 1) the cuprous chloride (CuCl) has a high melting temperature of 430° C., 2) the color of CuCl after melting is non-transparent dark grey, which makes it difficult to see oxygen bubbles inside it, 3) the CuCl molten salt is very corrosive, 4) oxygen gas is a powerful oxidizer which will rapidly accelerate combustion of many materials and 5) the high temperature process.

In Abdulrahman (2015b) and Abdulrahman (2016a) which is corresponding US non-provisional application titled "MATERIAL SUBSTITUTION OF CUPROUS CHLORIDE MOLTEN SALT AND OXYGEN GAS IN THE THERMOLYSIS REACTOR OF HYDROGEN PRODUCTION Cu—Cl CYCLE", having application Ser. No. 15/210,782 and a filing date of Jul. 14, 2016 for which Mohammed Abdulrahman is an inventor, which are both hereby incorporated by reference in their entireties, dimensional analyses was performed in order to define alternative materials that can be used in the experimental studies and give similar effects of the hydrodynamic and heat transfer behaviors of the actual materials. From the dimensional analyses, it was found that the alternative materials that can be used in the experiments instead of CuCl molten salt and oxygen gas at 530° C. are liquid water at 22° C. and helium gas at 90° C., respectively. The advantages of these materials are their availability and their safe usage in the lab, in addition to the low temperatures used in experiments using these alternative materials. In the embodiments described herein, the above alternative materials are used to perform the experiments of the thermal scale up analysis of the thermolysis reactor vessel 10.

Experimental Setup

Figure 3:
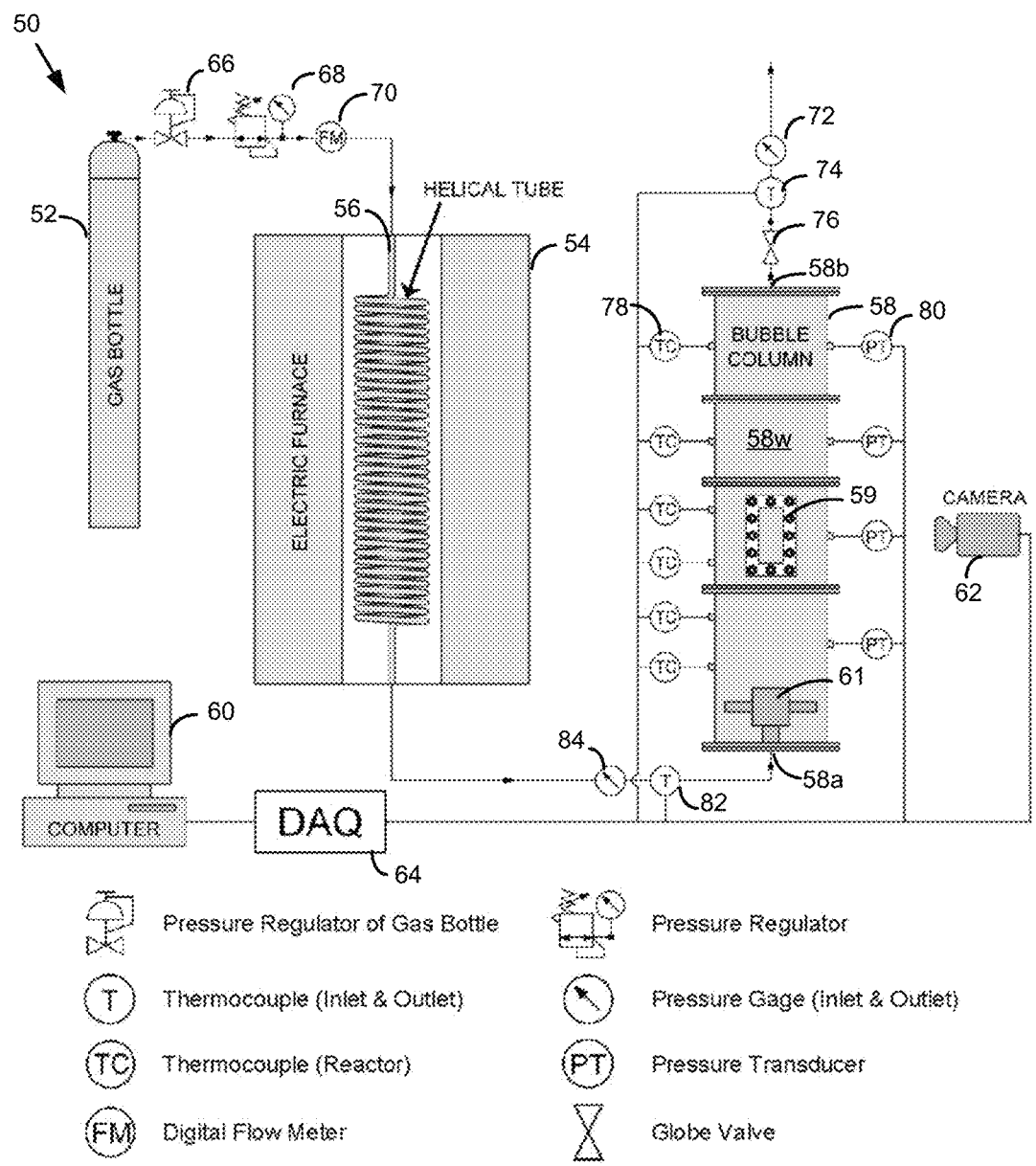
FIG. 3 is a schematic diagram of an example embodiment of the experimental setup.

The schematic diagram of the experimental setup 50 of a reactor is illustrated in FIG. 3. All experiments were performed in a stainless steel column 58 of 21.6 cm (8.5 in) inner diameter, 91.5 cm (36 in) height and 6 mm (0.25 in) thickness. To enable viewing the behavior of the bubbles that are formed inside the column 58, the reactor column 58 was provided with two windows (only one of which is visible and labelled as 59 and the other window is on the opposite side to allow light to shine into the inside of the reactor), located in the middle of the second section of the column 58 from the bottom of the reactor. A ball valve (not shown) was installed at the bottom of the column 58 to drain the slurry and clean the column 58. The column wall 58w was insulated by thermal insulation to reduce heat losses from the column wall 58w.

Four pressure transducers 80 (only one of which is labelled for simplicity) were mounted to pressure taps at different heights of the reactor 50 to measure the hydrostatic pressure head at these different heights. The locations of the pressure transducers 80 were 21 cm (8.25 in), 42.5 cm (16.75 in), 61.6 cm (24.26 in) and 80.6 cm (31.75 in) above the bottom 58a of the column 58, although other heights can be used in other embodiments. The pressure transducers 80 provide quasi-instantaneous pressure signals. Six thermocouples 78 (only one of which is labelled for simplicity), of type K, were mounted at different heights inside the column 58 to measure the temperature at these heights. These heights were 15.2 cm (6 in), 25.4 cm (10 in), 37.5 cm (14.75 in), 47.6 cm (18.75 in), 61.6 cm (24.25 in) and 80.6 cm (31.75 in), from the bottom 58a of the column 58 although other heights can be used in other embodiments.

Helium gas is injected into the column 58 through a six-arm spider-type gas sparger 61. The orifice diameter of the gas sparger 61 was designed to be 3 mm. The helium volumetric flow rate was measured using a digital flow meter 70 that was coupled to a pressure regulator 68 near the outlet of the gas bottle 52 to control the flow rate of the helium provided by the gas bottle 52.

A stainless steel helical tube 56 inside an electric furnace 54 was installed at a location after the digital flow meter 70 to heat the helium gas to a certain temperature before entering the reactor column 58. A one-way valve (not shown) was mounted before and near the inlet 58a at the bottom of the column 58 to allow the helium gas to enter the column 58 without backflow of water. Analog pressure gages 84 and 72 as well as thermocouples 82 and 74, of type K, were installed at the inlet 58a and outlet 58b, respectively, of the column 58 to measure the pressure and temperature of helium gas at these locations. Helium gas that exits from the column 58 is vented through a ventilation hood (not shown). The National instrument Field Point modules and LabView™ software were used for online data acquisition to monitor the readings from the thermocouples 74, 78 and 82 and the pressure transducers 80. The DAQ (Data Acquisition) 64 is a CompactDAQ USB chassis that provides the plug-and-play simplicity of USB to sensor and electrical measurements.

Experimental Procedure

In all experiments that were performed at an operating pressure of 0.1 MPa, the column 58 was first filled with tap water at about 22° C. to a specified level (e.g. 45, 55, and 65 cm). Helium gas that was oil free was then introduced into the column 58 and the gas flow rate was adjusted by using the pressure regulator 68 with the digital flow meter 70. Helium gas was heated to about 80° C. before entering the column 58 by using the helical tube 56 inside the electric furnace 54. The experimental system was given some time (about 5 min.) to reach the steady state condition, then the experimental measurements process began by measuring the hydrostatic pressures at different locations in the column 58, the temperatures at various points in the column 58 as well as the pressures and temperatures of the helium gas at the inlet 58a and outlet 58b of the column 58. The camera 62 was used to watch the behavior of the bubbles in the column 58 by using a computer during the run of the experiments.

Since single-sample data are those in which some uncertainties may not be discovered by repetition, each experimental run with a fixed static liquid level and solid concentration was repeated three times and the mean values of the gas holdup and volumetric heat transfer coefficient were determined. The relative standard deviation for the volumetric heat transfer coefficient was less than 10%. This procedure was repeated for different static water heights (e.g., 45, 55 and 65 cm), different solid concentrations (e.g., 0, 5 and 10%) and different gas flow rates ranging from 20 to 320 SLPM (Standard Liters Per Minute) which covers the bubbly flow regime and part of the churn turbulent flow regime.

Before inserting solid particles into the column 58, they were washed with tap water and then mixed with tap water for about 1 hr to ensure that they were completely wetted.

EXPERIMENTAL RESULTS AND DISCUSSION

1. Introduction

In the thermolysis reactor, since the materials of the inventories (e.g. the slurry and the oxygen gas) and the operating conditions are fixed, the experimental thermal scale up analysis will include only the effects of the column design parameters such as the static liquid height (H) and the input parameters such as: the superficial gas velocity ($U_{gs}$), and the solid particles concentration ($C_s$). These effects are formulated in the forms of empirical equations of the volumetric heat transfer coefficient ($U_V$).

2. Calculation of the Volumetric Heat Transfer Coefficient

The heating power exchanged between the gas and the slurry is expressed as (Robert, 2003):

$$\dot{Q} = U_V V_R \Delta T_{lm} \quad (1)$$

where $V_R$ is the total internal volume of the reactor that includes the total volume of the slurry and gas, $U_V$ is the volumetric heat transfer coefficient and $\Delta T_{lm}$ is the LMTD (Log Mean Temperature Difference) which can be expressed as:

$$\Delta T_{lm} = \frac{T_{g,in} - T_{g,out}}{\ln\left(\frac{T_{g,in} - \overline{T}_{sl}}{T_{g,out} - \overline{T}_{sl}}\right)} \quad (2)$$

In Eq. (2), the parameters $T_{g,in}$ and $T_{g,out}$ are the inlet and outlet gas temperatures respectively, and the parameter $\overline{T}_{sl}$ is the average temperature of the slurry. The exchanged heating power $\dot{Q}$ can be determined from the heating power exchanged by the gas phase as follows:

$$\dot{Q} = \dot{m}_g C_{p,g}(T_{g,in} - T_{g,out}), \quad (3)$$

where $\dot{m}_g$ is the gas mass flow rate and $C_{p,g}$ is the gas specific heat at constant pressure. Substituting Eq. (2) and Eq. (3) into Eq. (1) and solving for $U_V$ results in:

$$U_V = \frac{\dot{m}_g C_{p,g}}{V_R} \ln\left(\frac{T_{g,in} - \overline{T}_{sl}}{T_{g,out} - \overline{T}_{sl}}\right), \quad (4)$$

where the parameters $T_{g,in}$ and $T_{g,out}$ are the inlet and outlet thermocouples readings that represent the inlet and outlet gas temperatures respectively and the parameter $\overline{T}_{sl}$ is the average temperature of the slurry, which is determined from the thermocouples (that are submerged in the slurry) after stopping the gas injection into the reactor for few seconds.

The experimental data of the volumetric heat transfer coefficient was correlated using a priori information, such as, gas physical properties and reactor dimensions. Hence, helium gas properties such as density and specific heat are calculated at the average gas temperature ($\overline{T}_g$) as defined in Eq. 5.

$$\overline{T}_g = \frac{T_{g,in} + T_{g,out}}{2} \quad (5)$$

3. Effect of Superficial Gas Velocity ($U_{gs}$) on $U_V$

Figure 4:
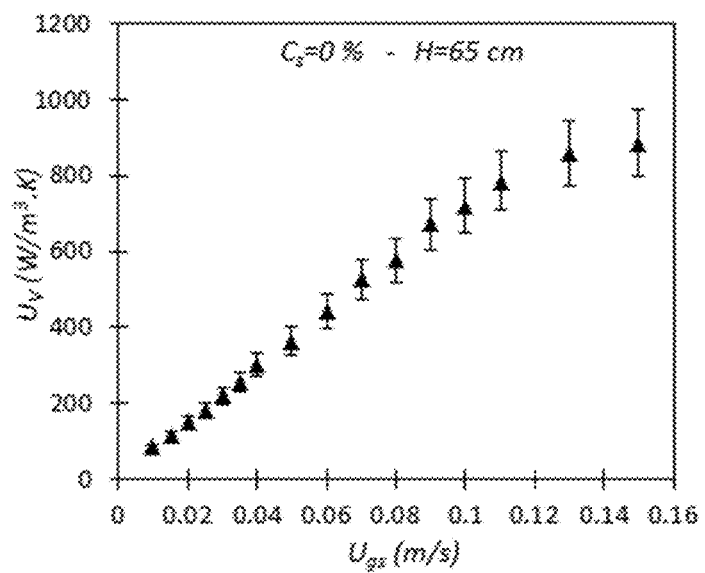
FIG. 4 shows a plot of the volumetric heat transfer coefficient versus $U_{gs}$ in the helium-water bubble column with $C_s$=0% and H=65 cm as determined by experimentation.

To study the effect of $U_{gs}$ on $U_V$, experiments were conducted for a range of $U_{gs}$ from 0.01 to 0.15 m/s. For each velocity, the readings of the thermocouples were recorded and $U_V$ was determined using Eq. (4). FIG. 4 shows the variation of $U_V$ with $U_{gs}$, in the water-helium bubble column with $C_s$=0% and H=65 cm. From FIG. 4, it can be seen that $U_V$ increases by increasing $U_{gs}$. This behavior is due to the increase in the gas flow rate which results in higher relative velocities between gas bubbles and liquid, and hence higher heat transfer rates. The results show that ($U_V$) increases by about 44%, when increasing $U_{gs}$ velocity from 0.1 to 0.15 m/s.

4. Effect of Static Liquid Height (H) on $U_V$

Figure 5A:
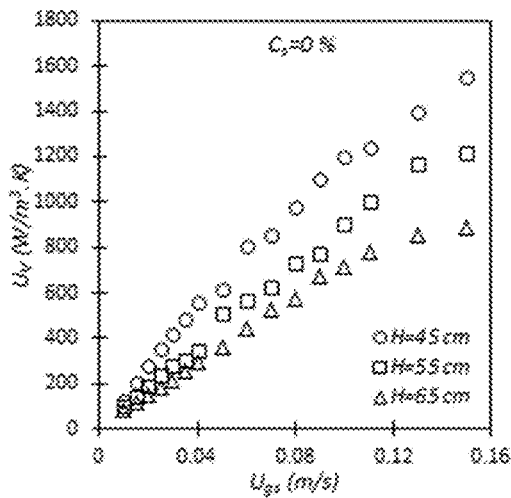
FIGS. 5a and 5b show plots of the volumetric heat transfer coefficient versus U of a helium-water-alumina slurry bubble column for different H and (=0% (FIG. 5a) or $C_s$=5% (FIG. 5b) as determined by experimentation.
Figure 5B:
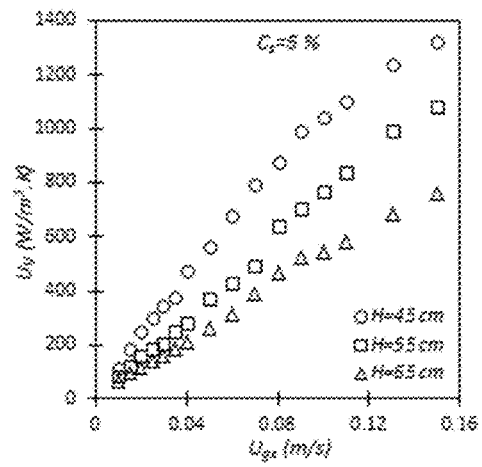
Figure 6A:
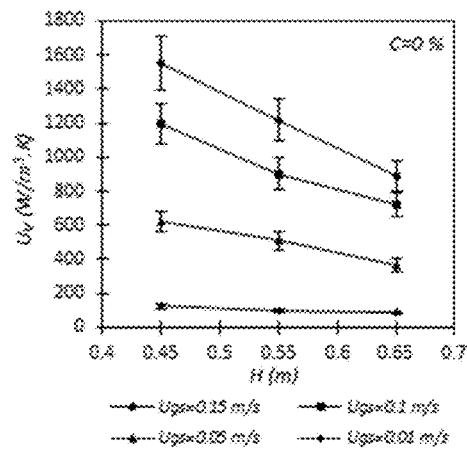
FIGS. 6a and 6b show plots of the volumetric heat transfer coefficient versus H of helium-water-alumina slurry bubble column for different $U_{gs}$ at $C_s$=0% (FIG. 5a) or $C_s$=5% (FIG. 5b) as determined by experimentation.
Figure 6B:
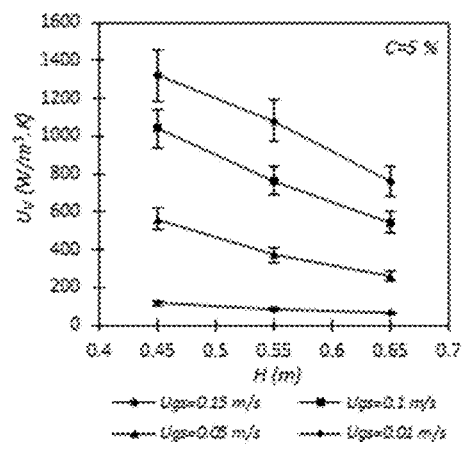

FIGS. 5a, 5b, 6a and 6b illustrate the effect of H on $U_V$ of the water-helium system with $C_s$=0% (i.e. FIGS. 5a and 6a) and $C_s$=5% (i.e. FIGS. 5b and 6b). As can be seen in FIGS. 5a-6b, $U_V$ shows a decreasing trend with increasing H at any given $U_{gs}$. When $C_s$=0%, the rate of decrease of $U_V$ is from 39-82% (for $U_{gs}$=0.01 to 0.15 m/s), when H increases from 45 to 65 cm. This decrease is due mainly to the increase of slurry volume. Also, for a given $U_{gs}$, the hydrostatic pressure increases by increasing H which leads to the decrease of slurry mixing rate.

5. Effect of Solid Concentration ($C_s$) on $U_V$

Figure 7A:
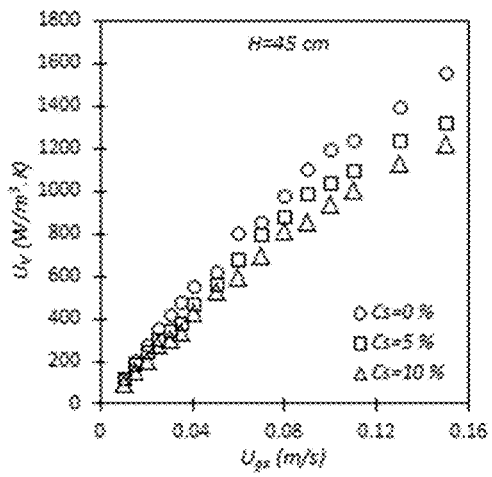
FIGS. 7a and 7b show plots of the volumetric heat transfer coefficient versus $U_{gs}$ of helium-water-alumina slurry bubble column for different $C_s$ at H=45 cm (FIG. 7a) and H=65 cm (FIG. 7b) as determined by experimentation.
Figure 7B:
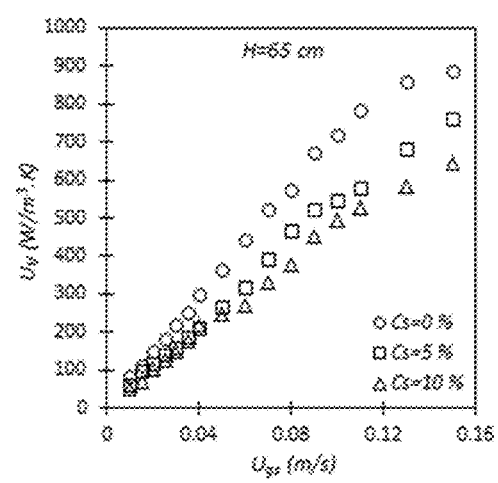

FIGS. 7a, and 7b show the effect of $C_s$ on $U_V$ versus $U_{gs}$ for different H. FIGS. 8a and 8b show the effect of $U_V$ versus $C_s$ for different $U_{gs}$ and H. From FIGS. 7a-8b, it can be seen that $U_V$ decreases by increasing $C_s$ at all static liquid heights. For instance, in the case of H=45 cm and $C_s$=0%, in the water-helium-alumina slurry bubble column, $U_V$ is equal to 1552.6 W/m³·K at $U_{gs}$=0.15 m/s, while at $C_s$=5%, it is equal to 1319.8 W/m³·K and at $C_s$=10% is equal to 1221.9 W/m³·K at the same $U_{gs}$. These behaviors can be attributed to the fact that increasing $C_s$ leads to an increase of large bubbles and a decrease of gas holdup, which leads to a decrease of the heat transfer rate between the gas and the slurry.

It can also be noted from FIGS. 7a, 7b, 8a and 8b, that the rate of decrease of $U_V$ values with $C_s$ is approximately the same for different $U_{gs}$. For example, when H=45 cm and $U_{gs}$=0.01 m/s, the value of ($U_V$ decreases by 21.8% for $C_s$=0-10%, and $U_V$ decreases by 21.3% when $U_{gs}$=0.15 m/s at the same value of H.

6. Flow Regime of the Thermolysis Reactor

The type of the flow regime in the thermolysis reactor can be determined by specifying the flow regime transition velocity of the alternative materials system (helium and water) and the superficial gas velocity of the stoichiometric oxygen gas. Abdulrahman (2016b) has investigated experimentally the transition velocity between homogeneous and churn turbulent flow regimes for the helium-water system and has found that the transition velocity ranges between 1.5-3 cm/s for static liquid heights between 45 cm and 65 cm and solid concentrations between 0% and 10%.

The transition velocity of the actual materials of the thermolysis reactor (i.e. molten CuCl and $O_2$ gas), can be obtained from (Abdulrahman, 2015b):

$$(Re_{g\text{-}trans})_{H_2O\text{-}He} = (Re_{g\text{-}trans})_{CuCl\text{-}O_2} \quad (6)$$

From Eq. (6), the transition velocity of the actual materials can be expressed as:

$$(U_{g\text{-}trans})_{CuCl\text{-}O_2} = \frac{\rho_{He}}{\rho_{O_2}} \frac{\mu_{O_2}}{\mu_{He}} (U_{g\text{-}trans})_{H_2O\text{-}He}, \quad (7)$$

where the parameters $\rho_{He}$ and $\rho_{O_2}$ are the densities of helium and oxygen gases respectively and the parameters $\mu_{He}$ and $\mu_{O_2}$ are the dynamic viscosities of helium and oxygen gases respectively. From Eq. (7), the flow regime transition velocity of CuCl—$O_2$ system, with a reactor diameter of 21.6 cm and a height of 45 cm, can be calculated as: $(U_{g\text{-}trans})_{CuCl-O_2}$=0.0148-0.0178 m/s. FIG. 9 shows the transition velocities of the actual materials of the thermolysis reactor for different static liquid heights and solid concentrations by depending on the results of the alternative materials experiments by Abdulrahman (2016b).

Figure 10:
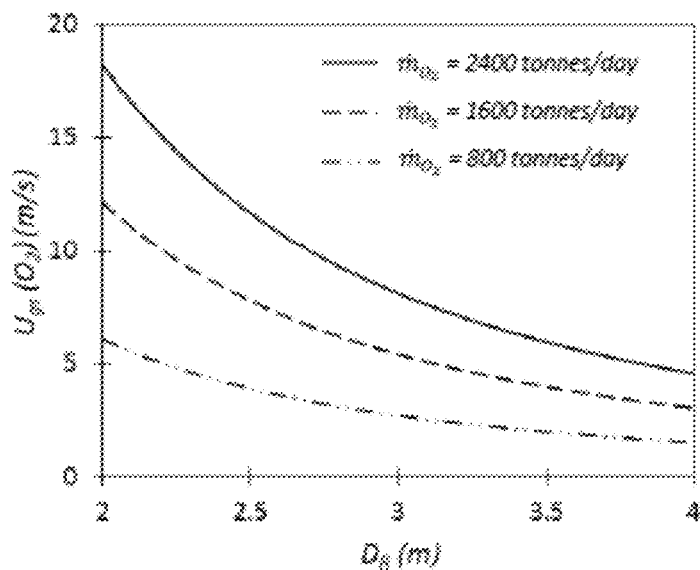
FIG. 10 shows the values of the superficial stoichiometric oxygen gas velocity for different reactor diameters ($D_R$) and oxygen production rates ($\dot{m}_{O_2}$).

The superficial gas velocity of the stoichiometric oxygen gas depends on the oxygen (or hydrogen) production rate and the diameter of the thermolysis reactor. FIG. 10 shows the values of the superficial oxygen gas velocity for different reactor diameters and oxygen production rates. From FIG. 10, it can be seen that the superficial oxygen gas velocity decreases by increasing the reactor diameter and decreasing the oxygen production rate. The minimum value of the superficial oxygen gas velocity is about 1.5 m/s when the reactor diameter is 4 m and the oxygen production rate is 800 tonnes/clay. This minimum value is higher than the transition velocity of the thermolysis reactor system with $C_s$=0% and H=45 cm, by more than 80 times. Since the transition velocity of the thermolysis reactor decreases by increasing $C_s$ and/or increasing H (Abdulrahman, 2016b), and since these parameters are large in the industrial thermolysis reactor, therefore, it is expected that the minimum stoichiometric superficial oxygen gas velocity will be much higher than the transition velocity of the thermolysis reactor system. From that, it can be concluded that the bubbly flow regime will never be existing in the thermolysis reactor system and the only regime that will be available in the thermolysis reactor is the churn-turbulent flow regime.

7. Dimensional Analysis of the Volumetric Heat Transfer Coefficient

The conceivable variables on which the volumetric heat transfer coefficient ($U_V$) may depend can be determined by carrying out dimensional analysis. By using Buckingham's pi theorem, the volumetric heat transfer coefficient may be written in terms of dimensionless groups as:

$$Nu_V = \left( f \frac{\rho_s}{\rho_l}, \frac{\rho_g}{\rho_{sl}}, \frac{\mu_g}{\mu_l}, \frac{k_s}{k_l}, \frac{k_g}{k_l}, \frac{C_{p,s}}{C_{p,l}}, \frac{C_{p,g}}{C_{p,l}}, Re_l, \frac{Re_l^2}{We_l}, Pr_l, \frac{H_R}{D_R}, \frac{d_o}{D_R}, \frac{d_p}{D_R}, C_s \right) \quad (8)$$

where;

$$Nu_V = \frac{U_V D_R^2}{k_l} \quad (9)$$

$$Re_l = \frac{\rho_l U_{gs} D_R}{\mu_l} \quad (10)$$

$$We_l = \frac{\rho_l U_{gs}^2 D_R}{\sigma} \quad (11)$$

$$Pr_l = \frac{C_{p,l} \mu_l}{k_l} \quad (12)$$

By fixing the materials properties ($\rho_s$, $\rho_l$, $\rho_g$, $\mu_l$, $\mu_g$, $k_s$, $k_l$, $k_g$, $C_{p,s}$, $C_{p,l}$, $C_{p,g}$, $\sigma$), the sparger hole diameter ($d_o$) (Abdulrahman, 2015a), and the solid particle size ($d_p$) (Abdulrahman, 2016c), the dimensionless groups $$\left( \frac{\rho_s}{\rho_l}, \frac{\rho_g}{\rho_l}, \frac{\mu_g}{\mu_l}, \frac{k_s}{k_l}, \frac{k_g}{k_l}, \frac{C_{p,s}}{C_{p,l}}, \frac{C_{p,g}}{C_{p,l}}, \frac{d_o}{D_R}, \frac{d_p}{D_R}, Pr_l \text{ and } \frac{Re_l^2}{We_l} \right)$$

can be omitted, and Eq. (8) will become Eq. (13).

$$Nu_V = f\left( Re_l, \frac{H_R}{D_R}, C_s \right) \quad (13)$$

The functional equation (Eq. (13)) can be written as:

$$Nu_V = C \left( \frac{H_R}{D_R} \right)^a (Re_l)^b (1-C_s)^c, \quad (14)$$

where the constant C and the exponents a, b and c are the pending coefficients that can be determined from experiments.

Different experiments were performed for different $U_{gs}$, $H_R$ and $C_s$ to measure the temperatures from the various thermocouples of FIG. 3 and then determine $Nu_V$ using Eqs. (4) & (9). The pending coefficients in Eq. (14) can then be obtained by using non-linear regressions as shown in the following equations for the different regimes.

Homogeneous flow regime:

$$Nu_V = 0.0165 \left( \frac{D_R}{H_R} \right)^{1.71} Re_l (1-C_s)^{3.32}, R^2 = 0.99 \quad (15)$$

Churn-turbulent flow regime:

$$Nu_V = 0.0315 \left( \frac{D_R}{H_R} \right)^{1.765} (Re_l)^{0.93} (1-C_s)^{2.94}, R^2 = 0.99 \quad (16)$$

The empirical equator's Eqs, (15) and (16) are used for;

$$\frac{H_R}{D_R} \leq 4,$$

Figure 11A:
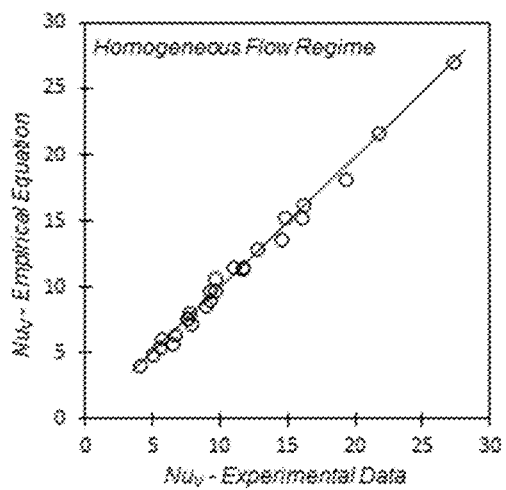
FIGS. 11a and 11b show the empirical equation (Eq. (15)) in FIG. 11a) and experimental data of (Eq. (16) in FIG. 11b) of $Nu_V$ for different H and $C_s$ values.
Figure 11B:
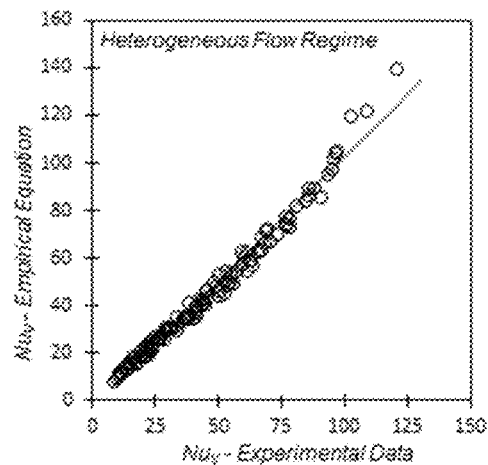

$C_s \leq 15\%$ and $U_{gs} \leq 0.15$ m/s. To check the validity of Eqs. (15) and (16), $Nu_V$ is calculated by these equations, under the same experimental conditions, and is plotted with the experimental data (see FIGS. 11a and 11b). It is found that the calculated values are in good agreement with the experimental data, and the maximum relative error is less than 12.1% for the homogeneous flow regime and less than 16% for the heterogeneous flow regime. Therefore, Eqs. (15) and (16) can be used to specify the volumetric heat transfer coefficient in the water-helium-alumina system.

7. Volumetric Heat Transfer Coefficient of the Thermolysis Reactor

The volumetric heat transfer coefficient of the actual materials used by the thermolysis reactor (i.e. molten CuCl and $O_2$ gas), can be obtained by equating $Nu_V$ of both $H_2O$—He and $CuCl$—$O_2$ systems (Abdulrahman, 2015b) as shown in Eq. (17).

$$(Nu_V)_{H_2O-He} = (Nu_V)_{CuCl-O_2} \quad (17)$$

By substituting Eq. (9) into Eq. (17) then:

$$(U_V)_{CuCl-O_2} = \frac{(k_{sl})_{CuCl-O_2}}{(k_{sl})_{H_2O-He}} (U_V)_{H_2O-He} \quad (18)$$

where $(k_{sl})_{CuCl-O_2}$ and $(k_{sl})_{H_2O-He}$ are the slurry thermal conductivities of the $CuCl$—$O_2$ and $H_2O$—He systems respectively, and $(U_V)_{CuCl-O_2}$ and $(U_V)_{H_2O-He}$ are the volumetric heat transfer coefficients of the $CuCl$—$O_2$ and $H_2O$—He systems respectively. FIGS. 12a and 12b show the volumetric heat transfer coefficients of the $O_2$—$CuCl$ system for different static liquid heights and solid concentrations.

8. Uncertainty Analysis

In the experimental work described herein, there are two main types of uncertainties: systematic and random uncertainties. Systematic uncertainties are related to the calibration errors in the measuring instruments or in the experimental techniques. For example, the measurement of the fluid temperature in the slurry bubble column system with a thermocouple probe may have systematic uncertainties. For example, it is well known that heat may be conducted from the stem of the thermocouple, out of the body, and into the surroundings, which may influence the temperature of the stem of the thermocouple. Therefore, the temperature reading of the thermocouple is not the true temperature of the fluid, and it will not make any difference how many readings are taken. Therefore, there will always be an uncertainty resulting from the heat-transfer condition of the stem of the thermocouple. This is a systematic uncertainty. In addition to the systematic uncertainties of measuring instruments, there are other sources of systematic uncertainties in the experimental system that increase the frictional and form losses and the losses of heat transfer such as; the sparger, the helical tube and the connecting pipes and fittings. In contrast, random uncertainties are related to the changes in the conditions of the performed experiments. Common sources of random errors in the experimental works are: fluctuations of operating conditions, random electronic fluctuations in the instruments and vibrations produced in the system.

Error Propagation

Error propagation is a method of calculating the uncertainty of a result that depends on several variables that have their own uncertainties. Kline and McClintock (1953) have presented a precise method to determine the uncertainty in experimental results ($\sigma_f$) (Bevington and Keith, 2003) which is given by:

$$\sigma_f^2 = \sigma_x^2 \left(\frac{\partial f}{\partial x}\right)^2 + \sigma_y^2 \left(\frac{\partial f}{\partial y}\right)^2 + \sigma_z^2 \left(\frac{\partial f}{\partial z}\right)^2 + \ldots, \quad (19)$$

where;
f is the result that is required to calculate its uncertainty such as: $U_V$;
x, y, z, . . . are the physical variables that the results depend on, such as: $\dot{m}_g$, $T_{g,in}$, $T_{g,out}$ and $T_{sl}$ for the result of $U_V$; and $\sigma_x$, $\sigma_y$, $\sigma_z$, . . . are uncertainties of the physical variables x, y, z, . . . respectively.

By using Eqs. (4) and (19), the maximum value of the volumetric heat transfer coefficient systematic uncertainty is calculated to be ±29 W/m³·K. The above systematic uncertainties are due to the calibration errors in the pressure transducers and the thermocouples. As indicated in the experimental procedure, the random uncertainties of the volumetric heat transfer coefficient are less than 10%. These uncertainties are mainly due to the fluctuations in the operating conditions. By taking into consideration the above uncertainties, the value of the volumetric heat transfer coefficient at $H_R$45 cm, $C_s$=0% and $U_{gs}$=0.05 m/s can be calculated as (620±91) W/m³·K.

9. Size of the Thermolysis Slurry Bubble Column Reactor

In the thermolysis reactor, since the flow is churn-turbulent as indicated in section 6, the empirical equation (Eq. (16)) is used to determine $Nu_V$. The volumetric heat transfer coefficient ($U_V$) is determined by using Eqs. (9) and (18), and the amount of heat transferred by using direct contact heat transfer is determined from Eq. (1). The dimensions of the thermolysis reactor are assumed to be a diameter of 4 m and a height of 8 m. From FIG. 10, for an oxygen production rate ($\dot{m}_{O_2}$) of 800 tonnes/day, the superficial gas velocity of the stoichiometric oxygen gas is 1.517 m/s.

By using Eqs. (1), (9), (16), and (18) as well as a reactor diameter of 4 m, a reactor height of 8 m and $C_s$=0%, the amount of heat that can be transferred by using a direct contact heat transfer configuration ($\dot{Q}_{DC}$) is calculated to be 67.624 MW. The number of thermolysis reactors (N) required for $\dot{m}_{H_2}$=100 tonnes/day (equivalent to $\dot{m}_{O_2}$=800 tonnes/clay) can be calculated by dividing the amount of heat needed for the decomposition process, which is ($\dot{Q}$=87 MW) (Abdulrahman, 2016d; 2016e), by the amount of heat transferred ($\dot{Q}_{DC}$=67.624 MW).

$$N = \frac{\dot{Q}}{\dot{Q}_{DC}} = \frac{87}{67.624} = 1.28 \approx 2 \text{ reactors} \quad (20)$$

When the determined reactor size is very large, the dimensions of the reactor can be fixed to specific values (e.g. a diameter of 4 m and a height of 8 m) and the number of reactors required for heat balance can be determined as mentioned in Abdulrahman et al, (2013).

Figure 14:
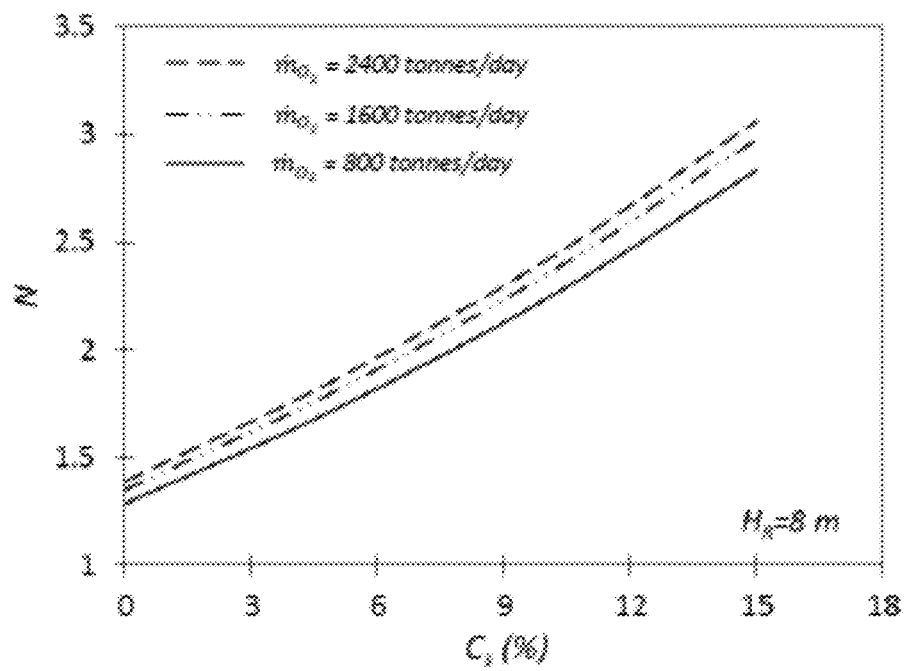
FIG. 14 shows the number of $O_2$ slurry bubble column reactors versus solid particle concentration ($C_s$) for different $\dot{m}_{O_2}$ and $H_R$=8 m.

FIGS. 13 and 14 show the effect of reactor height ($H_R$) and solid particle concentration ($C_s$) respectively in the number of thermolysis slurry bubble column reactors (N) for different $\dot{m}_{O_2}$. It can be seen from FIG. 13 that increasing $H_R$ will increase N insignificantly, where N increases from 1.27 to 1.286 by increasing $H_R$ from 4 m to 8 m for $\dot{m}_{O_2}$=800 tonnes/day and $C_s$=0%. FIG. 13 also shows that the effect of $\dot{m}_{O_2}$ on N is negligible, where for $H_R$=8 m and $C_s$=0%, the number of reactors (N) increases from 1.286 to 1.39 when $\dot{m}_{O_2}$ increases from 800 tonnes/day to 2,400 tonnes/day.

FIG. 14 shows that increasing $C_s$ will increase N, where N increases from 1.286 to 2.834 when $C_s$ increases from 0% to 15% for $\dot{m}_{O_2}$=800 tonnes/day and a reactor height of 8 m. FIG. 14 also shows that the effect of $\dot{m}_{O_2}$ on N is negligible, whereas for $H_R$=8 m and $C_s$=15%, the number of reactors (N) increases from 2.834 to 3.06 by increasing $\dot{m}_{O_2}$ from 800 tonnes/day to 2,400 tonnes/day. From above calculations, it can be concluded that the effects of $H_R$ and $\dot{m}_{O_2}$ on N can be neglected.

The above calculations of thermolysis reactor numbers depends on the amount of heat that can be transferred by using direct contact between the molten CuCl and the stoichiometric $O_2$ gas bubbles. For the thermolysis reactor, it is preferable to inject the heated oxygen gas at the same speed as the produced stoichiometric oxygen gas. The question that can be asked is "How much heat can the stoichiometric $O_2$ gas carry?" The answer to that question is obtained by determining the amount of heat that can be carried by the stoichiometric $O_2$ gas as follows:

$$\dot{Q}_{O_2} = \{\dot{m} C_p (T_{gin} - T_{gout})\}_{O_2}, \quad (21)$$

where $\dot{Q}_{O_2}$ is the amount of heat carried by $O_2$ gas, $\dot{m}$ is the mass flow rate of the oxygen gas and $C_p$ is the specific heat of the oxygen gas. For a CANDU-SCWR heat source, the inlet temperature of the oxygen gas ($T_{gin}$) is assumed to be 600° C. and the outlet temperature ($T_{gout}$) is assumed to be 540° C. (Abdulrahman, 2016d). From Eq. (21), using the superficial gas velocity of the stoichiometric oxygen gas for $\dot{m}_{O_2}$=800 tonnes/day and $C_s$=0%, the amount of heat ($\dot{Q}_{O_2}$) is determined to be 0.55 MW and the number of reactors required in this case is about 158. This number of reactors is very big compared to the number of reactors calculated from $\dot{Q}_{DC}$.

Figure 15:
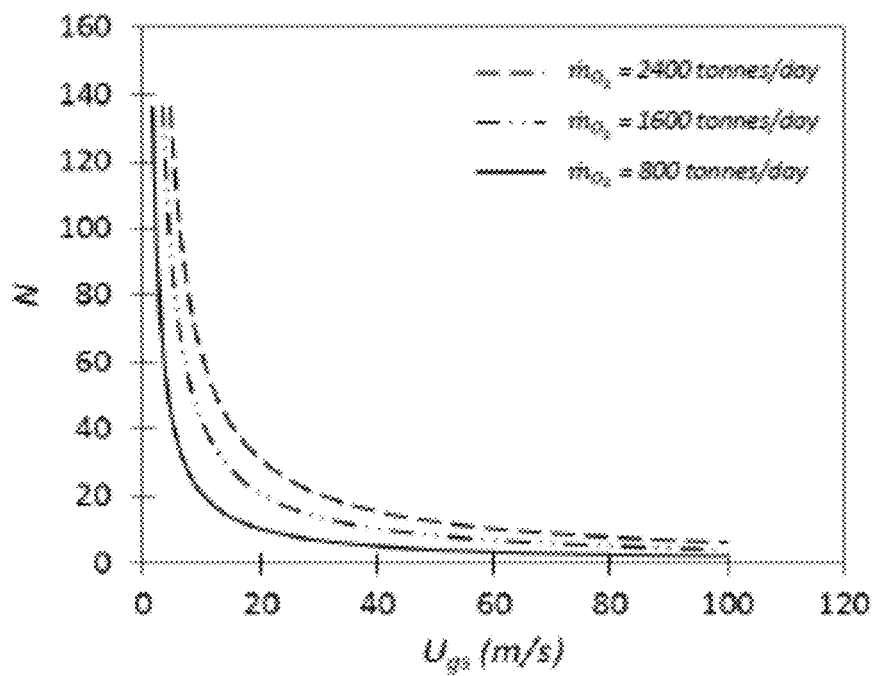
FIG. 15 shows the number of oxygen bubble column reactors versus superficial gas velocity of oxygen gas for a CANDU-SCWR and different oxygen production rates.

As indicated in Eq. (21), the value of $\dot{Q}_{O_2}$ can be increased by either increasing $\dot{m}_{O_2}$ or $(T_{gin} - T_{out})_{O_2}$. The temperature difference can be increased by using a higher temperature heat source rather than a CANDU-SCWR, such as a high temperature gas reactor (HTGR), where the inlet temperature can be taken as 900° C. and the outlet temperature is about 540° C. (Abdulrahman, 2016d). In this case, the number of thermolysis reactors will decrease to 35 when using the superficial gas velocity of stoichiometric oxygen bubbles for $\dot{m}_{O_2}$ =800 tonnes/day and $C_s$=0%. This number is still considered high compared with that determined from the material balance by Abdulrahman et al, (2013). The only option that remains to increase $\dot{Q}_{O_2}$ is to increase $\dot{m}_{O_2}$ by increasing the superficial gas velocity ($U_{gs}$) when selecting the reactor diameter ($D_R$). FIG. 15 shows the number of thermolysis reactors calculated from $\dot{Q}_{O_2}$ versus $U_{gs}$ for different $\dot{m}_{O_2}$. From FIG. 15, it can be seen that N decreases non-linearly with $U_{gs}$.

Since $\dot{Q}_{O_2}$ is less than $\dot{Q}_{DC}$, the number of thermolysis reactors (N) will depend mainly on $\dot{Q}_{O_2}$ rather than $\dot{Q}_{DC}$. In this case, for a specific heat source such as CANDU-SCWR and a specific reactor diameter ($D_R$), the value of N will depend only on the superficial gas velocity ($U_{gs}$) and the oxygen production rate ($\dot{m}_{O_2}$). By using the power function of curve fitting for the curves in FIG. 15, the following equation can be obtained for the number of thermolysis reactors (N) as a function of $U_{gs}$ and $\dot{m}_{O_2}$ with $R^2$=1:

$$N = \frac{0.3012 \, \dot{m}_{O_2}}{U_{gs}}, \quad (22)$$

where $\dot{m}_{O_2}$ is the oxygen production rate in tonnes/day and $U_{gs}$ is the oxygen superficial gas velocity in m/s.

Figure 16:
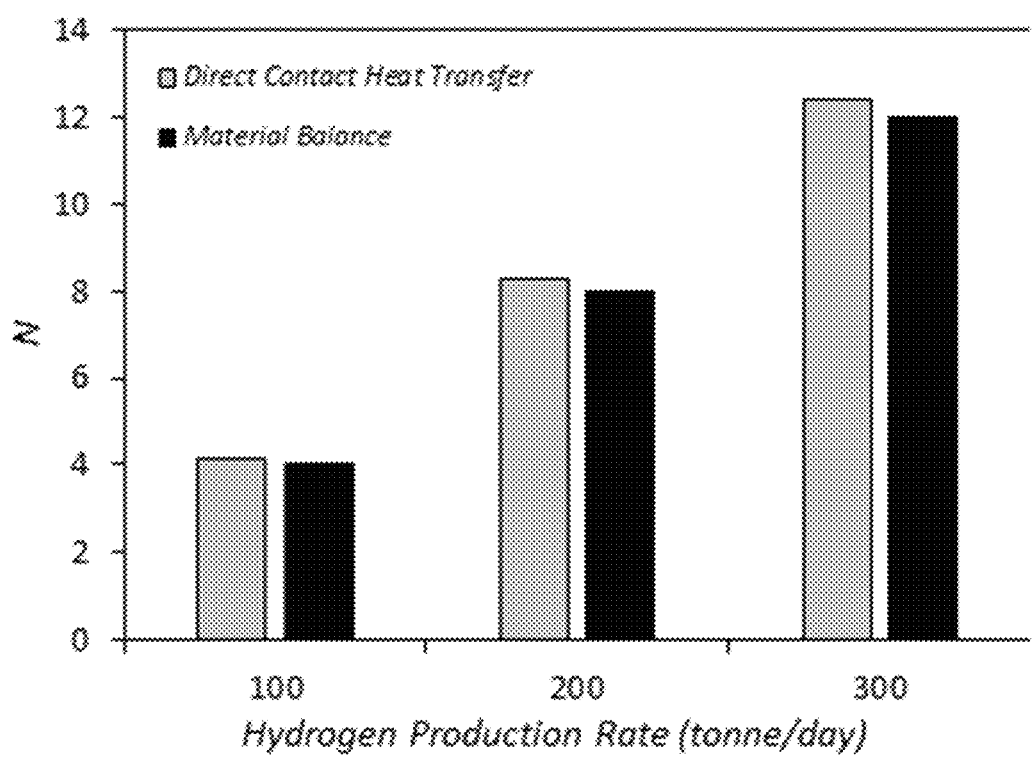
FIG. 16 shows a comparison in the number of thermolysis reactors (N) between the material balance and the heat balance by using the direct contact heat transfer configuration.

The size of the thermolysis reactor from the perspective of material balance can be determined by using the same method that was followed by Abdulrahman et at (2013). The total volume of the thermolysis reactor can be considered to be the sum of both the solid particles and molten salt volumes. In this way, for a reactor diameter of 4 m and an aspect ratio of 2, the number of thermolysis reactors obtained from material balance, for $\dot{m}_{O_2}$=800 tonnes/day (equivalent to $\dot{m}_{H_2}$=100 tonnes/day) and a residence time of 2 hours, is 4 thermolysis reactors. To keep the equivalent number of the thermolysis reactors when using the direct contact heat transfer configuration in the thermolysis slurry bubble column reactor, the superficial gas velocity has to be about 50 m/s. FIG. 16 shows a comparison in the number of thermolysis reactors versus hydrogen production rate between the material balance and the direct contact heat transfer configuration for the CANDU-SCWR neat source. The superficial gas velocity of the thermolysis slurry bubble column reactor is assumed to be 50 m/s. It can be seen from FIG. 16 that the sizes of the thermolysis reactor, determined from the material balance and the heat balance by using direct contact heat transfer configuration, are comparable.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

NOMENCLATURE $C_p$ Specific heat at constant pressure (J/kg·K)
$C_{p,g}$ Specific heat at constant pressure of gas (J/kg·K)
$C_{p,l}$ Specific heat at constant pressure of liquid (J/kg·K)
$C_{p,s}$ Specific heat at constant pressure of solid (J/kg·K)
$C_s$ Volumetric solid concentration
$d_o$ Orifice diameter (in)
$d_p$ Particle diameter (m)
$D_R$ Diameter of reactor (m)
H Height of static liquid (m)
$H_R$ Height of reactor (m)
k Thermal conductivity (W/m.° C.)/Turbulent kinetic energy (J)
$k_g$ Thermal conductivity of gas (Win ° C.)
$k_l$ Thermal conductivity of liquid (W/m.° C.)
$k_s$ Thermal conductivity of solid (W/m.° C.)
$\dot{m}$ Mass flow rate (kg/s)
$\dot{m}_g$ Mass flow rate of the gas (kg/s)
$\dot{m}_{H_2}$ Mass flow rate of hydrogen gas (kg/s)
$\dot{m}_{O_2}$ Mass flow rate of oxygen gas (kg/s)
N Number of reactors
Nu Nusselt number
Pr Prandtle number
$\dot{Q}$ Heat flow rate (W)
Re Reynolds number
$T_{g,in}$ Inlet gas temperature (° C.)
$T_{g,out}$ Outlet gas temperature (° C.)
$T_g$ Average gas temperature (° C.)
$T_{sl}$ Average slurry temperature (° C.)
$U_{gs}$ Superficial velocity of gas (m/s)
$U_{g\text{-}trans}$ Transition superficial velocity of gas (m/s)
$U_V$ Volumetric heat transfer coefficient (W/m$^3$.K)
$V_R$ Internal volume of the reactor (m$^3$)
We Weber number
Greek Letters
$\Delta T_{lm}$ Logarithmic mean temperature difference (° C.)
$\mu_g$ Dynamic viscosity of gas phase (Pa·s)
$\mu_l$ Dynamic viscosity of liquid phase (Pa·s)
$\rho_g$ Density of gas (kg/m$^3$)
$\rho_l$ Density of liquid (kg/m$^3$)
$\rho_s$ Density of solid (kg/m$^3$)
$\rho_{sl}$ Density of slurry (kg/m$^3$)

REFERENCES

Abdulrahman, M. W. (2015a). Experimental studies of direct contact heat transfer in a slurry bubble column at high gas temperature of a helium-water-alumina system. *Applied Thermal Engineering*, 91, 515-524.

Abdulrahman, M. W. (2015b), "Material Simulation of Cuprous Chloride Molten Salt and Oxygen Gas with Liquid Water and Helium Gas in the Oxygen Reactor of Hydrogen Production Cu—Cl Cycle", U.S. Provisional Patent No. 62/192,518, filed on Jun. 14, 2015.

Abdulrahman, M. W. (2016a), "Material substitution of Cuprous Chloride Molten Salt and Oxygen Gas in the thermolysis reactor of Hydrogen Production Cu—Cl Cycle", U.S. Non-Provisional patent Ser. No. 15/210,782, filed on Jun. 14, 2016.

Abdulrahman, M. W. (2016b). Experimental studies of the transition velocity in a slurry bubble column at high gas temperature of a helium-water-alumina system. *Experimental Thermal and Fluid Science*, 74, 404-410.

Abdulrahman, M. W. (2016c). Experimental studies of gas holdup in a slurry bubble column at high gas temperature of a helium-water-alumina system. *Chemical Engineering Research and Design*, 109, 486-494.

Abdulrahman, M. W. (2016d). Similitude for thermal scale-up of a multiphase thermolysis reactor in the cu-cl cycle of a hydrogen production. *World Academy of Science. Engineering and Technology, International Journal of Electrical, Computer, Energetic, Electronic and Communication Engineering*, 10 (5), 567-573.

Abdulrahman, M. W. (2016e). Heat transfer analysis of a multiphase oxygen reactor heated by a helical tube in the cu-cl cycle of a hydrogen production. *World Academy of Science, Engineering and Technology, International Journal of Mechanical, Aerospace, Industrial, Mechatronic and Manufacturing Engineering*, 10(6), 1018-1023.

Abdulrahman, M. W., Wang, Z., & Naterer, a F. (2013). Scale-up analysis of three-phase oxygen reactor in the Cu—Cl thermochemical cycle of hydrogen production. *EIC Climate Change Technology Conference* 2013 (CCTC2013). Montreal, Canada.

Bevington, P. R., & Keith, R. (2003), *Data Reduction and Error Analysis for the Physical Sciences* (3$^{rd}$ ed.). McGraw-Hill, New York.

Kline, S. J., & McClintock, F. A. (1953). Describing uncertainties in single-sample experiments. *Journal of Mechanical Engineering*, 75, 3-8.

Lewis, M. A., Serban, M., & Basco, J. K. (2003). Generating hydrogen using a low temperature thermochemical cycle. *Proceedings of the ANS/ENS Global International conference on Nuclear Technology*, New Orleans.

Marin, G. D. (2012). Kinetics and transport phenomena in the chemical decomposition of copper oxychloride in the thermochemical Cu—Cl cycle (Doctoral dissertation). University of Ontario Institute of Technology, Ontario, Canada.

Naterer, G. F., Gabriel, K., Wang, Z. L., Daggupati, V. N., & Gravelsins, R. (2008). Thermochemical hydrogen production with a copper-chlorine cycle. I: Oxygen release from copper oxychloride decomposition. *International Journal of Hydrogen Energy*, 33, 5439-5450.

Boehm, R. F. (2003). Direct contact heat transfer. In A. Bejan, & A. D. Kraus (Eds.), *Heat transfer handbook* (p. 1374). John Wiley & Sons, Inc.

Serban, M., Lewis, M. A., & Basco, J. K. (2004, April). Kinetic study of the hydrogen and oxygen production reactions in the copper-chloride thermochemical cycle. *American Institute of Chemical Engineers Journal*, Spring National Meeting, New Orleans, La., pp, 2690-2698.

The invention claimed is:

1. A method for facilitating the thermochemical Cu—Cl cycle of hydrogen production in a thermolysis reactor having a reactor housing and a reaction chamber, wherein the method comprises:
   receiving copper oxychloride solid particles into the reaction chamber;
   decomposing the copper oxychloride solid particles thermally into oxygen gas and molten cuprous chloride;
   expelling the oxygen gas;
   heating a portion of the expelled oxygen gas that is produced from the decomposition process in the thermolysis reactor, by using an intermediate heat exchanger that exchanges heat from a nuclear reactor heat source; and
   injecting the heated portion of the expelled oxygen gas through an inlet in a bottom portion of the reactor housing into the reaction chamber by using means for injecting the gas stream, whereby the heated portion of the expelled oxygen gas is in direct contact heat transfer with the slurry of the copper oxychloride solid particles and the molten cuprous chloride to provide a required amount of heating for the endothermic decomposition process inside the thermolysis reactor of the thermochemical Cu—Cl cycle.

2. The method of claim 1, wherein the expelled oxygen gas is stoichiometric high temperature oxygen gas that is produced from the decomposition process inside the thermolysis reactor at a temperature of about 530° C., and the portion of the expelled oxygen gas is heated to a temperature of about 600° C.

3. The method of claim 1, wherein the method comprises performing experimental thermal scale up analysis of the thermolysis reactor to determine the volumetric heat transfer coefficient for the direct contact heat transfer between the heated portion of the expelled oxygen gas and the slurry of copper oxychloride solid particles and molten cuprous chloride based on parameters including at least one of a static liquid height (H), a superficial gas velocity ($U_{gs}$), and a solid particles concentration ($C_s$).

4. The method of claim 3, wherein the effects of the parameters are formulated using empirical equations of a volumetric Nusselt number ($Nu_V$).

5. The method of claim 4, wherein the empirical equation of the volumetric Nusselt number for a bubbly flow regime is:

$$Nu_V = 0.0165 \left(\frac{D_R}{H_R}\right)^{1.71} Re_l \, (1-C_s)^{3.32}.$$

6. The method of claim 4, wherein the empirical equation of the volumetric Nusselt number for a churn turbulent flow regime is:

$$Nu_V = 0.0315 \left(\frac{D_R}{H_R}\right)^{1.765} (Re_l)^{0.93} \, (1-C_s)^{2.94}.$$

7. The method of claim 5, wherein the equation of the volumetric Nusselt number for the bubbly flow regime is used when:

$$\frac{H_R}{D_R} \leq 4,$$

$C_s \leq 15\%$ and $U_{gs} \leq 0.15$ m/s.

8. The method of claim 6, wherein for the thermolysis reactor of the thermochemical copper-chlorine cycle of hydrogen production, the only regime that is available is the chum-turbulent flow regime.

9. The method of claim 1, wherein the direct contact heat transfer between the heated portion of the expelled oxygen gas and the slurry of copper oxychloride solid particles and molten cuprous chloride is enough to transfer the heat needed for the endothermic decomposition process in the thermolysis reactor.

10. The method of claim 9, wherein the thermal scale up analysis of the thermolysis reactor with the direct contact heat transfer method is performed based on the amount of heat carried by the heated portion of the oxygen gas according to: $\dot{Q}_{O_2} = \{\dot{m}C_p(T_{gin} - T_{gout})\}_{O_2}$.

11. The method of claim 10, wherein the method comprises adjusting the rate of injecting the heated portion of the expelled oxygen gas to control the amount of heat that can be transferred by using the direct contact heat transfer between the heated portion of the expelled oxygen gas and the slurry of copper oxychloride solid particles and molten cuprous chloride.

12. The method of claim 6, wherein the equation of the volumetric Nusselt number for the chum turbulent regime is used when:

$$\frac{H_R}{D_R} \leq 4,$$

$C_s \leq 15\%$ and $U_{gs} \leq 0.15$ m/s.

* * * * *